United States Patent
King et al.

(10) Patent No.: US 7,854,310 B2
(45) Date of Patent: Dec. 21, 2010

(54) PARKING METER

(75) Inventors: David William King, San Diego, CA (US); Murray David Kirby Hunter, Balmain (AU); Mathew James Hall, Balmain (AU); David Andrew Jones, Balmain (AU)

(73) Assignee: IPS Group, Inc., San Diego, CA (US)

( * ) Notice: Subject to any disclaimer, the term of this patent is extended or adjusted under 35 U.S.C. 154(b) by 113 days.

(21) Appl. No.: 12/072,524

(22) Filed: Feb. 27, 2008

(65) Prior Publication Data

US 2008/0245638 A1 Oct. 9, 2008

(30) Foreign Application Priority Data

Feb. 27, 2007 (AU) ............... 2007900999

(51) Int. Cl.
*G07F 9/10* (2006.01)
(52) U.S. Cl. ..................................... 194/350
(58) Field of Classification Search .................. 194/350
See application file for complete search history.

(56) References Cited

U.S. PATENT DOCUMENTS

| | | | |
|---|---|---|---|
| 2,161,046 A * | 6/1939 | Hitzeman | .................... 194/205 |
| 4,880,097 A | 11/1989 | Speas | |
| 5,222,076 A | 6/1993 | Ng et al. | |
| 5,563,491 A | 10/1996 | Tseng | |
| 5,614,892 A | 3/1997 | Ward, II et al. | |
| 5,659,306 A | 8/1997 | Bahar | |
| 5,841,369 A | 11/1998 | Sutton et al. | |
| 5,842,411 A | 12/1998 | Jacobs et al. | |
| 5,852,411 A | 12/1998 | Jacobs et al. | |
| 6,111,522 A | 8/2000 | Hiltz et al. | |
| 6,309,098 B1 * | 10/2001 | Wong | .......................... 368/94 |
| 6,312,152 B2 | 11/2001 | Dee et al. | |
| 6,457,586 B2 * | 10/2002 | Yasuda et al. | ............... 209/534 |
| 2001/0051531 A1 | 12/2001 | Singhal et al. | |
| 2003/0128136 A1 | 7/2003 | Spier et al. | |
| 2006/0152349 A1 | 7/2006 | Ratnakar | |
| 2008/0071611 A1 * | 3/2008 | Lovett | .......................... 705/13 |
| 2008/0238715 A1 | 10/2008 | Cheng et al. | |

FOREIGN PATENT DOCUMENTS

EP 0980055 B1 2/2000

OTHER PUBLICATIONS (Cell Net Data Systems) "First Wireless Monitoring of Parking Meters Results in Theft Arrests Using CellNet Data Systems Technology," PRNewswire, May 11, 1999, 2 pages.

* cited by examiner

*Primary Examiner*—Stefanos Karmis
*Assistant Examiner*—Mark J Beauchaine
(74) *Attorney, Agent, or Firm*—Townsend and Townsend and Crew LLP

(57) ABSTRACT

A parking meter assembly (10) including a base (11) that is to be fixed to or embedded in a ground surface, typically adjacent the curb that which a car is to be parked. The assembly (10) also includes a parking meter (13) having a front face (17) that includes a coin slot (25) a card slot (20) and a control panel (21). The parking meter (13) further includes a rear face (27) having a window aperture (28) that provides for the transmission of light to a solar panel (29) behind the aperture (28).

11 Claims, 5 Drawing Sheets

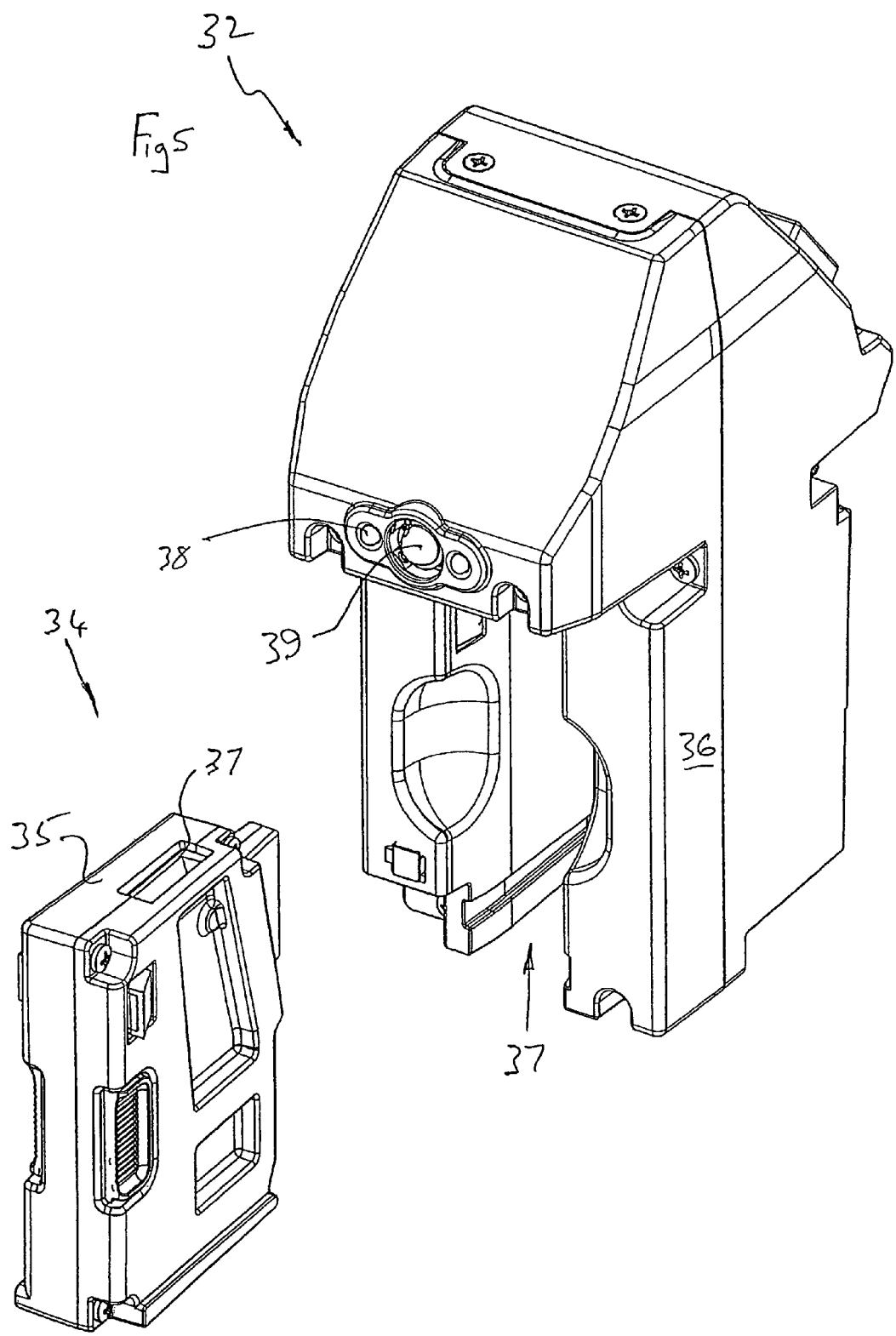

PARKING METER

TECHNICAL FIELD

The present invention relates to parking meters and more particularly to electrically powered parking meters.

BACKGROUND OF THE INVENTION

Parking meters initially were coin operated. They were known to consist of a module to be fixed to a post having a lower end embedded in a ground surface typically adjacent a kerb adjacent which vehicles were to be parked. The parking meters were operated by inserting a coin and then turning a knob to activate a "clock" mechanism. When a certain period had expired, the parking meter would display a sign indicating the parking period had expired.

The abovementioned parking meters had a number of disadvantages including complexity of the working mechanisms, unreliability in respect of coins jamming and not being well adapted to provide a range of parking times and costs in respect thereof. A still further advantage is that were restricted to coin operation.

OBJECT OF THE INVENTION

It is the object of the present invention to overcome or substantially ameliorate at least one of the above disadvantages.

SUMMARY OF THE INVENTION

There is disclosed herein a parking meter including:
a coin sensor;
a card reader;
an electronic device electrically connected to the sensor and reader so as to receive information electronically therefrom, a display to provide information visually, a telephone connection to provide receiving information in respect of a card used in respect of said card reader, and connections for at least one rechargeable battery to power the reader, sensor and device; and
a solar cell operatively associated with said connections to charge said battery;
a body having;
a front face having a coin slot into which coins are inserted for delivery to the sensor and then the coin storage facility;
a card slot into which a card is inserted to be read by said reader, and a rear face providing a window via which said solar cell is exposed to light, and providing visual access to said display.

Preferably, said meter includes an indicator to provide an indication whether a parking period has expired.

Preferably, said indicator is adjacent or at said rear face.

Preferably, said meter is adapted to be fixed to a post fixed to a ground surface, with said body including a set of panels to be fixed relative to said post, and a cover panel pivotally attached to the panel set for pivoting movement about a generally horizontal axis between a closed position and an open position.

Preferably, said meter includes controls at said front face via which a user can operate the parking meter.

Preferably, said coin sensor, said card reader, said device and said control panel are a module removable as an assembly from within said body.

Preferably, said module includes a body, and said coin sensor is a coin validator unit removably located in said body.

Preferably, said telephone is a mobile (cellular) telephone.

Preferably, said front face and rear face converge upwardly.

BRIEF DESCRIPTION OF THE DRAWINGS

A preferred form of the present invention will now be described by way of example with reference to the accompanying drawings wherein:

FIG. 5 is a schematic rear isometric view of a module of the parking meter of FIG. 2.

DETAILED DESCRIPTION OF THE PREFERRED EMBODIMENT

Figure 1:
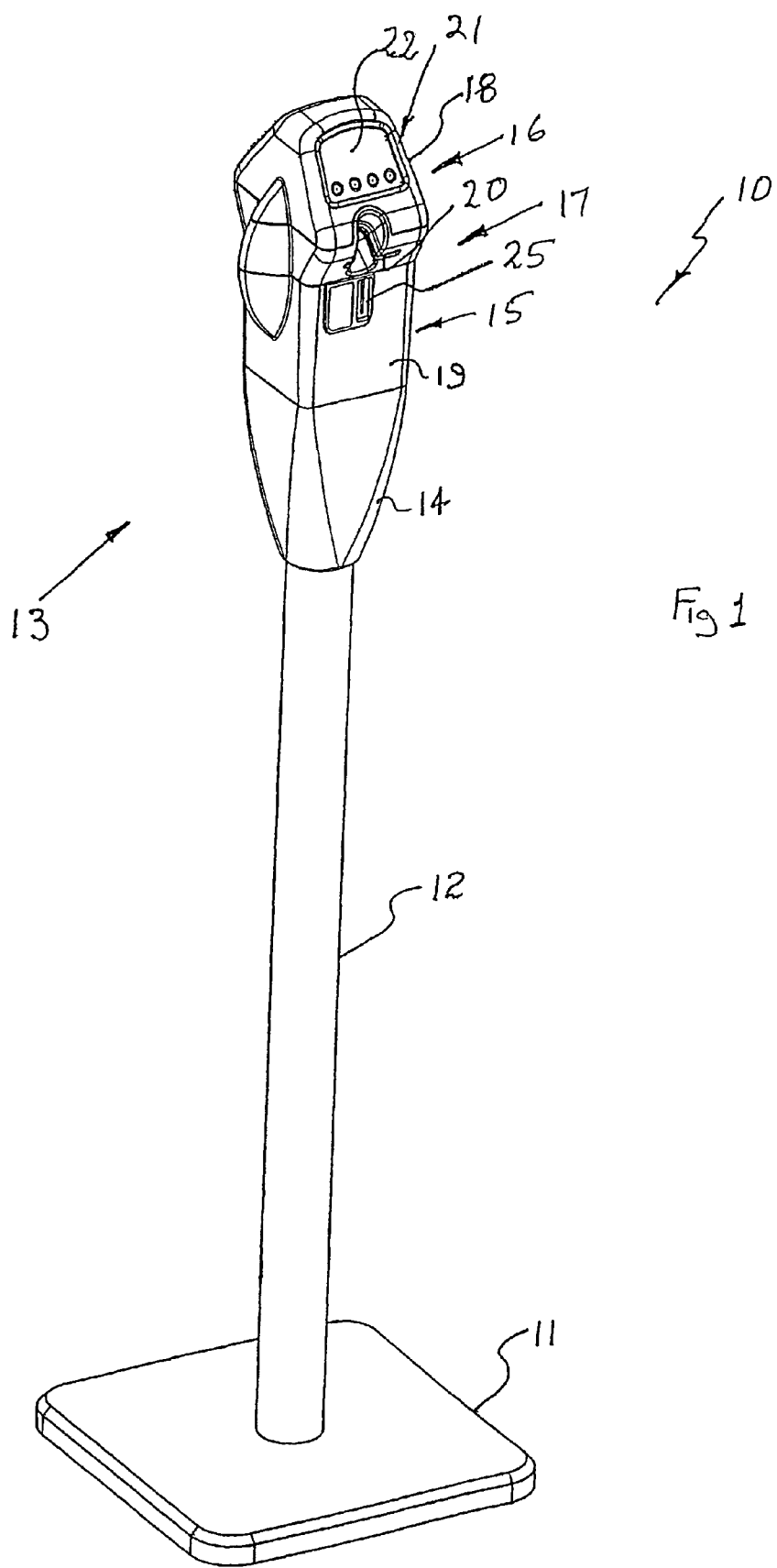
FIG. 1 is a schematic isometric view of a parking meter assembly.

In the accompanying drawings there is schematically depicted a parking meter assembly 10. The assembly 10 includes a base 11 that would be fixed to or embedded in a ground surface, typically adjacent the kerb at which a car is to be parked. Attached to the base and extending upwardly therefrom is a post 12 to the upper end of which there is attached a parking meter 13. The parking meter 13 includes a lower skirt 14 that is to be fixed to the post 12, an intermediate panel set 15, and a cover panel 16 pivotally mounted relative to the panel set 15. The cover panel 16 and panel set 15 provide a front face 17 having front face portions 18 and 19. The front face 17 includes a coin slot 25, a card slot 20 and a control panel 21. The control panel 21 includes a window 22, and buttons 24 that are manipulated by a user to operate the parking meter 13. The window 22 provides a user with means of viewing a screen 23 via which information is conveyed to the user. The information typically would include date, time and when the parking period is to expire and perhaps further information such as when the parking meter 13 is operable, information in respect of card use and cost.

Figure 2:
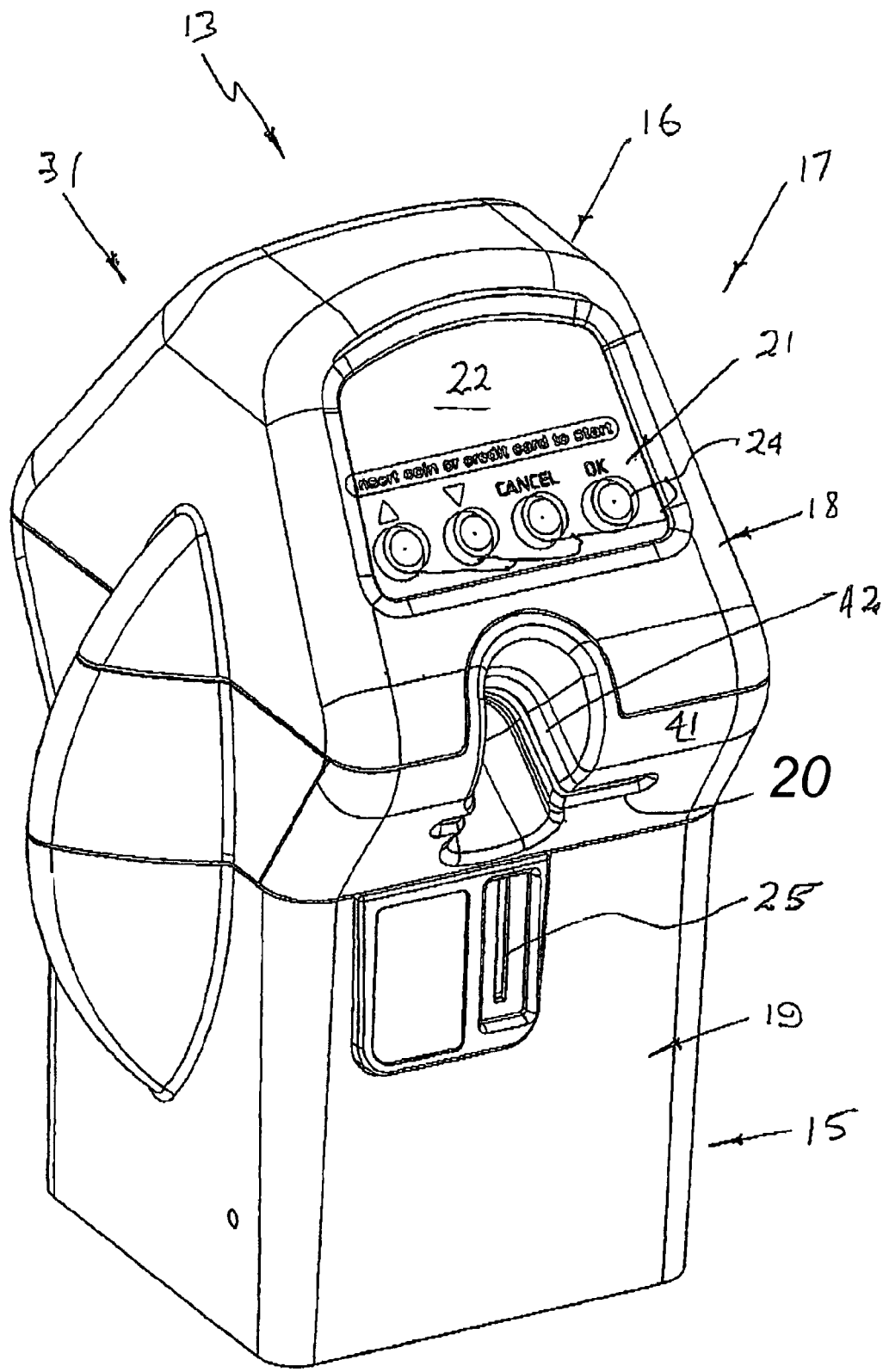
FIG. 2 is a schematic front isometric view of a parking meter employed in the assembly of FIG. 1.
Figure 3:
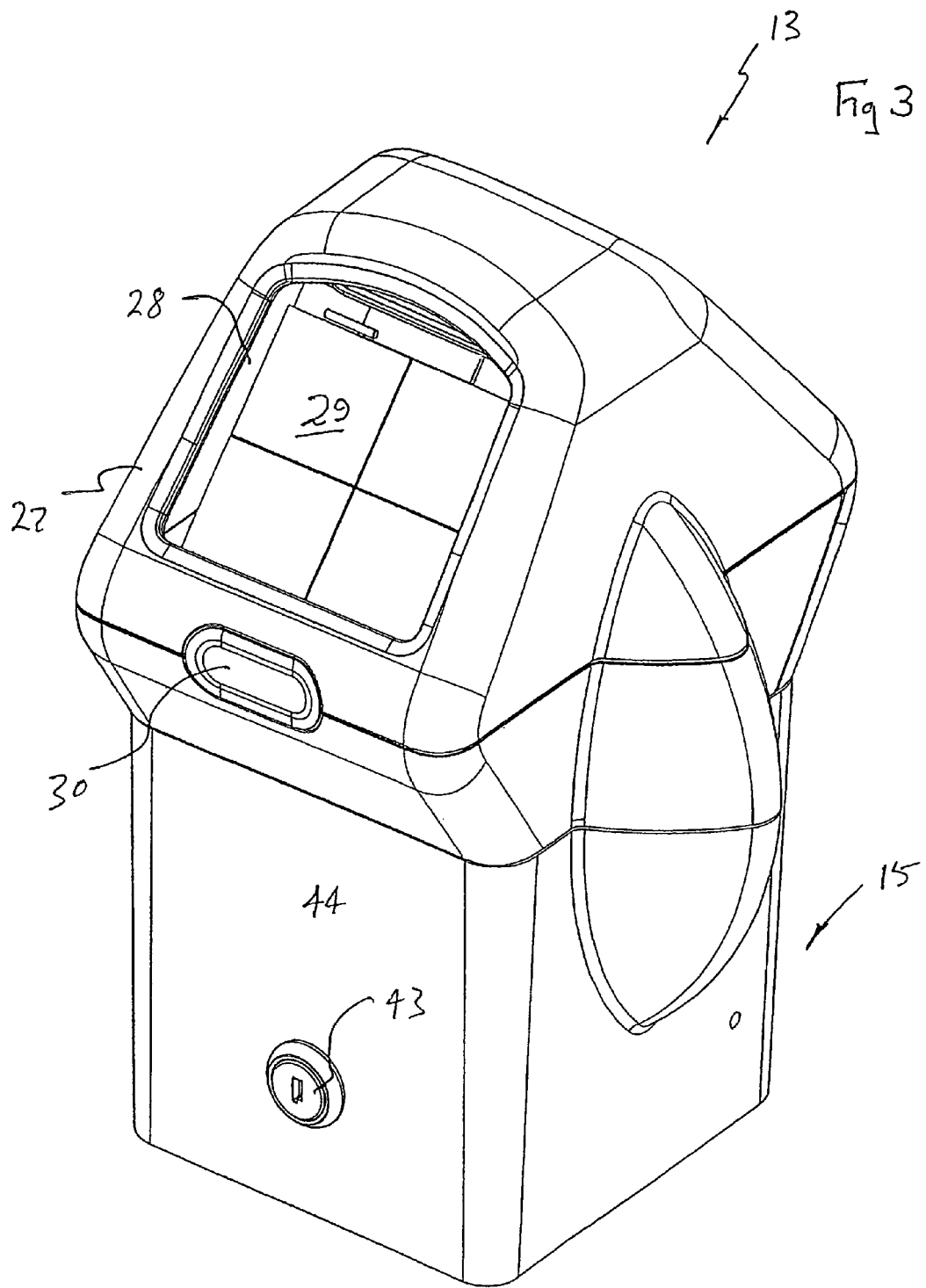
FIG. 3 is a schematic rear isometric view of the parking meter of FIG. 2.
Figure 4:
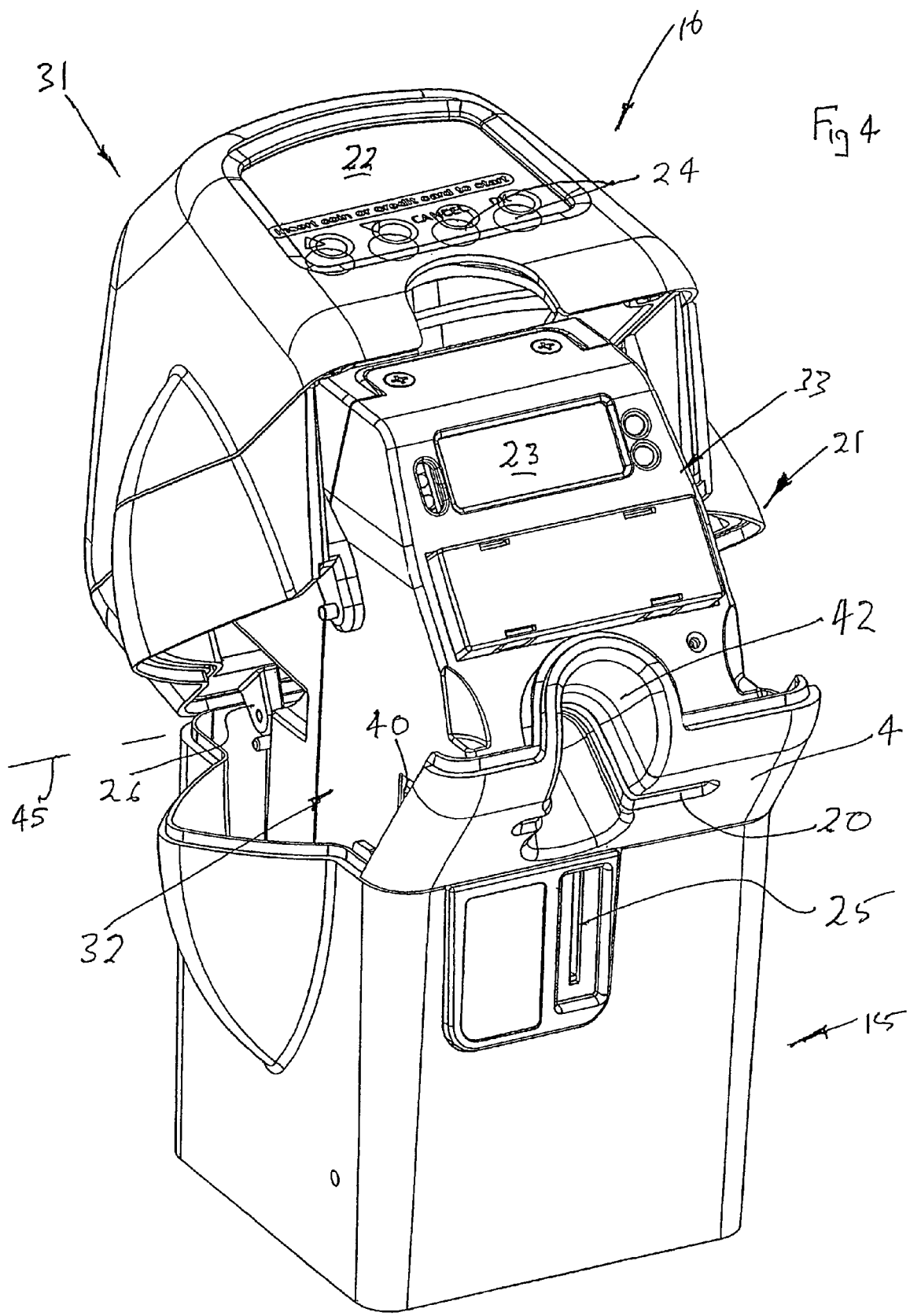
FIG. 4 is a schematic front isometric view of the parking meter of FIG. 2 with a top panel pivoted to an open position.

The cover panel 16 is pivotally attached to the panel set 15 by means of a pivot 26 providing a generally horizontal pivot axis 45 that is generally normal to the post 12. The cover panel 16 is pivotally movable through an acute angle from the closed position as shown in FIGS. 1 and 2, to the open position shown in FIG. 4. In an alternative form, the panel 16 may be slidably attached.

The rear of the parking meter 13 includes a rear face 27 as part of the cover panel 16. The rear face 27 includes a window aperture 28 that receives a panel that provides for the transmission of light to a solar panel 29. The front face portion 18 and rear face 27 converge upwardly so that they are both inclined by acute angles to the horizontal.

At or adjacent the rear face 27 is an indicator 30 that can be viewed easily by a parking ranger moving past the meter 10, the indicator 30 providing an indication in respect of whether a parking period has expired.

When mounted adjacent a kerb separating a footpath from a roadway, the rear face 27 would face the adjacent roadway and the front face 17 away from the roadway so that a user would be standing on the footpath and facing their vehicle when operating the meter 13.

The panel set 15 and cover panel 16 provide a housing 31 within which a module 32 is located. The module 32 includes an electronic device 33 that incorporates the screen 23. The module 32 particularly includes a coin sensor 34 in the form of a coin validator 35. The coin validator 35 is received within a slot 37 of the body 36 of the module 32. Typically the coin validator 35 would provide a passage 37 through which coins would move to be "counted" and validated for the purposes of the coin validator 35 providing a signal in respect of whether appropriate coins have been delivered to the slot 25. Accordingly, the passage 37 would communicate with the slot 25 so as to receive coins therefrom. Once passing through the coin validator 35, the coins are delivered to a coin receptacle than can be cleared. The coin receptacle is located behind the skirt 14 which preferably has a door to provide for access to the coin receptacle. The coin validator 35 is provided as a unit and is removable from the module 32, when the module 32 is removed from within the housing 31.

The module 32 is also provided with a light (LED) 38 and/or colour disk 39 that are operated to provide an indication in respect of whether a parking period has expired. The light 38 and/or disk 39 are part of the indicator 30 and can be seen by the parking ranger. Typically the disk 39 would be pivotally mounted and would be "flipped" to be black or red, the red indicating that a parking period has expired.

Located immediately behind the slot 20 is a card reader 40 that would read the magnetic strip (or other information providing device) on a credit or debit card.

The coin validator 35 and card reader 40 are electrically linked to the control panel 21 to provide information therefor in respect of whether payment has been made.

Preferably, the device 33 would include a mobile (cellular) phone link so that information may be conveyed and received in respect of a credit or debit card read by the card reader 40. The device 33 may also include a power supply (battery), an IR port and LED status indicators.

Preferably, the slot 20 is located in a plane that is inclined to the horizontal by an acute angle so that the slot 20 slopes downwardly to an inclined surface 41 being part of the front face 17. The surface 41 is downwardly facing so as to protect the slot 20 from water penetration. The surface 41 is also provided with a recess 42 enabling a user's fingers to hold the card while "swiping" card through the slot 20.

A key operated lock 43 is located in a rear panel 44 of the panel set 15, the lock 43 being operable to release the cover panel 16 when appropriate key is used.

The invention claimed is:

1. A parking meter including:
   a coin sensor;
   a card reader;
   an electronic device electrically connected to the sensor and reader so as to receive information electronically therefrom, the electronic device having a screen to provide information visually, a telephone connection to provide receiving information in respect of a card used in respect of said card reader, and connections for at least one rechargeable battery to power the reader, sensor and device;
   a solar cell operatively associated with said connections to charge said battery;
   a housing in which the coin sensor, card reader, and electronic device are located, the housing comprising an intermediate panel set and a cover panel, wherein the cover panel is movably attached to the intermediate panel set, and a surface of the cover panel and a surface of the intermediate panel set comprise a front face, and the front face surface of the cover panel includes a control panel having a window and a plurality of buttons that operate the parking meter upon manipulation by a user;
   a coin slot in the front face into which coins are inserted for delivery to the sensor and then to a coin receptacle;
   a card slot in the front face into which a card is inserted to be read by said reader;
   a rear face comprising a surface of the cover panel and a surface of the intermediate panel set providing a window aperture via which said solar cell is exposed to light;
   wherein the coin sensor and the card reader are electrically linked to provide information to the electronic device to provide information of whether payment has been made;
   wherein the screen of the electronic device is visible through the window of the control panel when the cover panel is attached to the intermediate panel.

2. The parking meter of claim 1, wherein said meter includes an indicator to provide an indication whether a parking period has expired.

3. The parking meter of claim 2, wherein said indicator is adjacent or at said rear face.

4. The parking meter of claim 1, wherein said meter is adapted to be fixed to a post fixed to a ground surface, with said intermediate panel set including a set of panels to be fixed relative to said post, and the cover panel is pivotally attached to the intermediate panel set for pivoting movement about a generally horizontal axis between a closed position and an open position.

5. The parking meter of claim 1, wherein said coin sensor, said card reader, said electronic device and said screen are a module removable as an assembly from within said housing.

6. The parking meter of claim 5, wherein said module includes a body, and said coin sensor is a coin validator unit removably located in said body.

7. The parking meter of claim 1, wherein said telephone connection is a mobile (cellular) telephone connection.

8. The parking meter of claim 1, wherein said front face and rear face converge upwardly.

9. A parking meter comprising:
   a housing comprising an intermediate panel set and a cover panel, the cover panel being movably attached to the intermediate panel set, wherein a first surface of the cover panel and a first surface of the intermediate panel set comprise a parking meter front face, the first surface of the cover panel having a first window and a plurality of buttons that operate the parking meter upon manipulation by a user, wherein a second surface of the cover panel and a second surface of the intermediate panel set comprise a parking meter rear face, the rear face surface of the cover panel providing a second window;
   a module configured to be removably received by the housing, the module comprising
      (a) a coin sensor,
      (b) a card reader, and
      (c) an electronic device electrically connected to the sensor and the reader so as to receive information electronically therefrom, the electronic device comprising
         (i) a screen to provide information visually via the first window when the cover panel is attached to the intermediate panel set,
         (ii) a telephone connection to provide receiving information in respect of the card reader,
         (iii) a rechargeable battery electrically coupled to provide power to the reader, the sensor, and the electronic device, and
         (iv) a solar cell operatively coupled with the rechargeable battery to charge the rechargeable batter, the solar cell being disposed to receive light via the second window;

a coin slot in the parking meter front face into which coins are inserted for delivery to the coin sensor and then to a coin receptacle; and a card slot in the parking meter front face into which a card is inserted to be read by the reader;

wherein the coin sensor and the card reader are electrically linked to provide information to the electronic device to provide information of whether payment has been made.

10. The parking meter of claim 9, wherein said card slot slopes downwardly to be accessible via the front face surface of the intermediate panel, and the front face surface of the intermediate panel is downwardly facing.

11. The parking meter of claim 9, wherein the coin sensor comprises a coin validator unit that is removably attached to the module and includes the coin receptacle such that the coin sensor communicates with the coin slot of the parking meter front face when attached to the module for receiving inserted coins.

* * * * *

UNITED STATES PATENT AND TRADEMARK OFFICE
CERTIFICATE OF CORRECTION

| | |
|---|---|
| PATENT NO. | : 7,854,310 B2 |
| APPLICATION NO. | : 12/072524 |
| DATED | : December 21, 2010 |
| INVENTOR(S) | : King et al. |

It is certified that error appears in the above-identified patent and that said Letters Patent is hereby corrected as shown below:

In the claims

Column 4, line 65, please delete "batter" and replace with --battery--

Signed and Sealed this
First Day of December, 2015

Michelle K. Lee
*Director of the United States Patent and Trademark Office*